(12) United States Patent
Harel et al.

(10) Patent No.: US 8,843,917 B1
(45) Date of Patent: *Sep. 23, 2014

(54) TECHNIQUES FOR PARALLEL DRIVE UPGRADE WHILE MAINTAINING HOST ACCESSIBILITY

(71) Applicants: Shay Harel, Marlborough, MA (US); Peter Puhov, Shrewsbury, MA (US); Wayne Garrett, Bellingham, MA (US); Lili Chen, Hopkinton, MA (US); Zhiqi Liu, Hopkinton, MA (US)

(72) Inventors: Shay Harel, Marlborough, MA (US); Peter Puhov, Shrewsbury, MA (US); Wayne Garrett, Bellingham, MA (US); Lili Chen, Hopkinton, MA (US); Zhiqi Liu, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/737,295

(22) Filed: Jan. 9, 2013

Related U.S. Application Data

(63) Continuation of application No. 13/329,685, filed on Dec. 19, 2011, now Pat. No. 8,375,385.

(51) Int. Cl.
*G06F 9/44* (2006.01)
*G06F 9/445* (2006.01)

(52) U.S. Cl.
CPC .................................. *G06F 8/65* (2013.01)
USPC ............................................ 717/173; 717/178

(58) Field of Classification Search
USPC .......................................................... 717/173
See application file for complete search history.

(56) References Cited

U.S. PATENT DOCUMENTS

| | | | |
|---|---|---|---|
| 6,675,258 B1 * | 1/2004 | Bramhall et al. | 711/114 |
| 7,640,535 B2 * | 12/2009 | Somogyi et al. | 717/119 |
| 7,849,073 B2 * | 12/2010 | Young-Lai | 707/713 |
| 7,930,691 B2 * | 4/2011 | Bhattacharya et al. | 717/171 |
| 8,089,487 B2 * | 1/2012 | Mannen et al. | 345/532 |
| 8,201,163 B2 * | 6/2012 | Walker et al. | 717/174 |
| 8,250,257 B1 * | 8/2012 | Harel et al. | 710/38 |
| 8,375,385 B1 * | 2/2013 | Harel et al. | 717/173 |
| 8,566,637 B1 * | 10/2013 | Puhov et al. | 714/6.32 |
| 2004/0216107 A1 * | 10/2004 | Somogyi et al. | 718/100 |
| 2006/0259597 A1 * | 11/2006 | Jiang et al. | 709/222 |
| 2007/0188507 A1 * | 8/2007 | Mannen et al. | 345/532 |
| 2007/0276850 A1 * | 11/2007 | Bhattacharya et al. | 707/101 |
| 2008/0215915 A1 * | 9/2008 | Zhou et al. | 714/15 |
| 2009/0279549 A1 * | 11/2009 | Ramanathan et al. | 370/395.4 |
| 2011/0167217 A1 * | 7/2011 | Montgomery | 711/114 |

OTHER PUBLICATIONS

"EMC® NetWorker® Release 7.5 Performance Tuning Guide", Dec. 2008, © 2008 EMC Corporation, retrieved from <http://nsrd.info/documentation/nw75/75_performance_tuning.pdf> total pp. 88.*

* cited by examiner

*Primary Examiner* — Don Wong
*Assistant Examiner* — Marina Lee
(74) *Attorney, Agent, or Firm* — Muirhead and Saturnelli, LLC

(57) ABSTRACT

Described are techniques for performing a firmware update. A drive management object determines one or more physical drives matching criteria of a first received request. The drive management object sends to provision drive objects a second request to update firmware on physical drives. Firmware update processing is performed independently for each physical drive. Each provision drive object is associated with one of the physical drives. Firmware update processing for said one physical drive includes determining whether to perform the firmware update at a current point in time; in response to determining to perform the firmware update at the current point in time, performing preparation processing; notifying, upon completion of said preparation processing, a physical drive object associated with said one physical drive to download the firmware update to the one physical drive; and resuming I/O operations to the one physical drive upon successfully completing the firmware update.

20 Claims, 10 Drawing Sheets

TECHNIQUES FOR PARALLEL DRIVE UPGRADE WHILE MAINTAINING HOST ACCESSIBILITY

RELATED APPLICATIONS

This application is a continuation of U.S. patent application Ser. No. 13/1329,685, which is now U.S. Pat. No. 8,375,385 B1 filed on Dec. 19, 2011, entitled TECHNIQUES FOR PARALLEL DRIVE UPGRADE WHILE MAINTAINING HOST ACCESSIBLITY, which is incorporated by reference herein in its entirety.

BACKGROUND

1. Technical Field

This application relates to techniques data storage systems such as data storage arrays and more particularly to techniques used in connection with upgrading physical drives of a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a data storage system, it may be necessary to upgrade the firmware on one or more of the physical drives. Some systems may perform firmware updates to physical drives whereby the physical drives and, more generally, the entire data storage system including such physical drives, may be taken offline. In this manner, the physical drives are unavailable to service host I/Os during the firmware updating of the physical drives where applications on the host issuing such I/O operations to the physical devices are stopped. Additionally, the data storage system may be rebooted multiple times as part of the firmware update process. Some systems may perform online firmware updates whereby host-data storage system connectivity may not be lost. However, such online updates may only allow firmware upgrade of a single physical drive per each RAID group and may be time consuming due to this restriction. Additionally, some online firmware update techniques may not allow for updating any physical devices not configured to have a mirror.

SUMMARY OF THE INVENTION

In accordance with one aspect of the invention is a method of performing a firmware update of physical drives in a data storage system comprising: receiving, by a drive management object of a storage processor of the data storage system, a first request to perform a firmware update to physical drives of the data storage system; determining, by the drive management object in accordance with criteria included in the first request, one or more physical drives matching the criteria thereby identifying the one or more physical drives as physical drives having firmware to be updated; sending, by the drive management object to each of one or more provision drive objects corresponding to the one or more physical drives, a second request to update firmware on said one or more physical drives; performing firmware update processing independently for each of the one or more physical drives, each of the one or more provision drive objects associated with one of the physical drives, said firmware update processing for said one physical drive including: determining, by said each provision drive object associated with the one physical drive, whether to perform the firmware update to the one physical drive at a current point in time; in response to determining to perform the firmware update to the one physical drive at the current point in time, performing preparation processing in connection with preparing for updating the firmware on the one physical drive, the preparation processing further including holding any new incoming I/Os for the one physical drive and completing any in-progress I/O operations for the one physical drive; notifying, by said each provision drive object upon completion of said preparation processing, a physical drive object associated with said one physical drive to download the firmware update to the one physical drive; and resuming I/O operations to the one physical drive upon successfully completing the firmware update to the one physical drive. Holding any new incoming I/Os for the one physical drive may include storing the new incoming I/Os in a buffer. Resuming I/O operations to the one physical drive may include performing the I/O operations in the buffer and allowing any subsequently received I/O operations for the one physical drive to be serviced. Completing any in-progress I/O operations for the one physical drive may include completing any I/O operations commenced prior to performing preparation processing. The storage processor may be a first of a plurality of storage processors of the data storage system, each of said plurality of storage processors having access to each of the one or more physical drives. The one or more provision drive objects may be a first set of provision drive objects of the first storage processor and a second set of one or more provision drive objects may be used by a second of the plurality of storage processors. Each provision drive object of the first set may have a counterpart provision drive object of the second set for a same physical drive, wherein each of the one or more provision drive objects in the first set that may be associated with one of the one or more physical drives may further perform other processing comprising: said each provision drive object in the first set sending a message to a first counterpart provision drive object of the second set on the second storage processor to perform second preparation processing including holding any new incoming I/Os for the one physical drive and completing any in-progress I/O operations for the one physical drive; and sending a message from said first counterpart provision drive object to said each provision drive object upon completion of said second preparation processing. The step of determining, by said each provision drive object, whether to perform the firmware update to the one physical drive at a current point in time may include querying a client object of said each provision drive object as to whether to perform the firmware update for the one physical drive at the current point in time. Each provision drive object may receive a response from the client object indicating not to perform the firmware update for the one physical drive at the current point in time and said each provision drive object repeatedly performs the querying at one or more later points in time until a response is received indicating for said each provision drive object to proceed with the firmware update. The client object may enforce one or more policies setting forth policy criteria as to when a firmware update for a physical drive is allowable. The one or more policies may include a first policy indicating that a firmware update for a physical drive is allowable based on policy criteria determined for a particular RAID group configuration. The one or more policies may include a first policy indicating that a firmware update for a physical drive that is a mirror of a second physical drive is allowable if the second physical drive is not currently having a firmware update applied thereto and if the second physical drive is currently available to service I/Os directed to either the first physical drive or the second physical drive. Each provision drive objects may notify the drive management object upon successfully completing the firmware update for said one physical drive. A plurality of physical drives may be determined by the drive management object in accordance with criteria included in the first request as requiring a firmware update initiated by the request, and wherein said firmware update processing may be performed in parallel for the plurality of physical drives.

In accordance with another aspect of the invention is a method of performing a firmware update of physical drives in a data storage system comprising: receiving, by a drive management object of a first storage processor of the data storage system, a first request to perform a firmware update to physical drives of the data storage system; determining, by the drive management object in accordance with criteria included in the first request, one or more physical drives matching the criteria thereby identifying the one or more physical drives as physical drives having firmware to be updated; sending, by the drive management object to each of one or more provision drive objects, a second request to update firmware on said one or more physical drives, said one or more provision drive objects being included in a first set of provision drive objects of the first storage processor corresponding to the one or more physical drives, each of the provision drive objects in the first set having a corresponding provision drive object in a second set of provision drive objects of a second storage processor of the data storage system wherein said each provision drive object in the first set and its corresponding provision drive object in the second set are associated with a same one of the one or more physical drives; performing firmware update processing independently for each of the one or more physical drives, wherein each of the one or more provision drive objects of the first set is associated with one of the one or more physical drives, said firmware update processing for said one physical drive including: determining, by said each provision drive object of the first set, whether to perform the firmware update to the one physical drive at a current point in time; in response to determining to perform the firmware update to the one physical drive at the current point in time, performing preparation processing in connection with preparing for updating the firmware on the one physical drive, the preparation processing further including: sending a message from said each provision drive object to a second provision drive object of the second set on the second storage processor instructing the second provision object to perform second processing including holding any new incoming I/Os for the one physical drive and completing any in-progress I/O operations for the one physical drive, said each provision drive object and said second provision drive object being associated with said one physical drive; and holding, by said each provision drive object, any new incoming I/Os for the one physical drive and completing any in-progress I/O operations for the one physical drive; notifying, by said each provision drive object of the first set upon completion of said preparation processing, a physical drive object associated with said one physical drive to download the firmware update to the one physical drive; and resuming I/O operations to the one physical drive upon successfully completing the firmware update to the one physical drive. Resuming I/O operations for the one physical drive may include said each provision drive object notifying the second provision drive object regarding said resuming.

In accordance with another aspect of the invention is a computer readable medium comprising code stored thereon for performing a firmware update of physical drives in a data storage system, the computer readable medium comprising code for: receiving, by a drive management object of a storage processor of the data storage system, a first request to perform a firmware update to physical drives of the data storage system; determining, by the drive management object in accordance with criteria included in the first request, one or more physical drives matching the criteria thereby identifying the one or more physical drives as physical drives having firmware to be updated; sending, by the drive management object to each of one or more provision drive objects corresponding to the one or more physical drives, a second request to update firmware on said one or more physical drives; performing firmware update processing independently for each of the one or more physical drives, each of the one or more provision drive objects associated with one of the physical drives, said firmware update processing for said one physical drive including: determining, by said each provision drive object associated with the one physical drive, whether to perform the firmware update to the one physical drive at a current point in time; in response to determining to perform the firmware update to the one physical drive at the current point in time, performing preparation processing in connection with preparing for updating the firmware on the one physical drive, the preparation processing further including holding any new incoming I/Os for the one physical drive and completing any in-progress I/O operations for the one physical drive; notifying, by said each provision drive object upon completion of said preparation processing, a physical drive object associated with said one physical drive to download the firmware update to the one physical drive; and resuming I/O operations to the one physical drive upon successfully completing the firmware update to the one physical drive. Holding any new incoming I/Os for the one physical drive may include storing the new incoming I/Os in a buffer. Resuming I/O operations to the one physical drive may include performing the I/O operations in the buffer and allowing any subsequently received I/O operations for the one physical drive to be serviced. Completing any in-progress I/O operations for the one physical drive may include completing any I/O operations commenced prior to performing preparation processing. The storage processor may be a first of a plurality of storage processors of the data storage system, each of said plurality of storage processors having access to each of the one or more physical drives.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
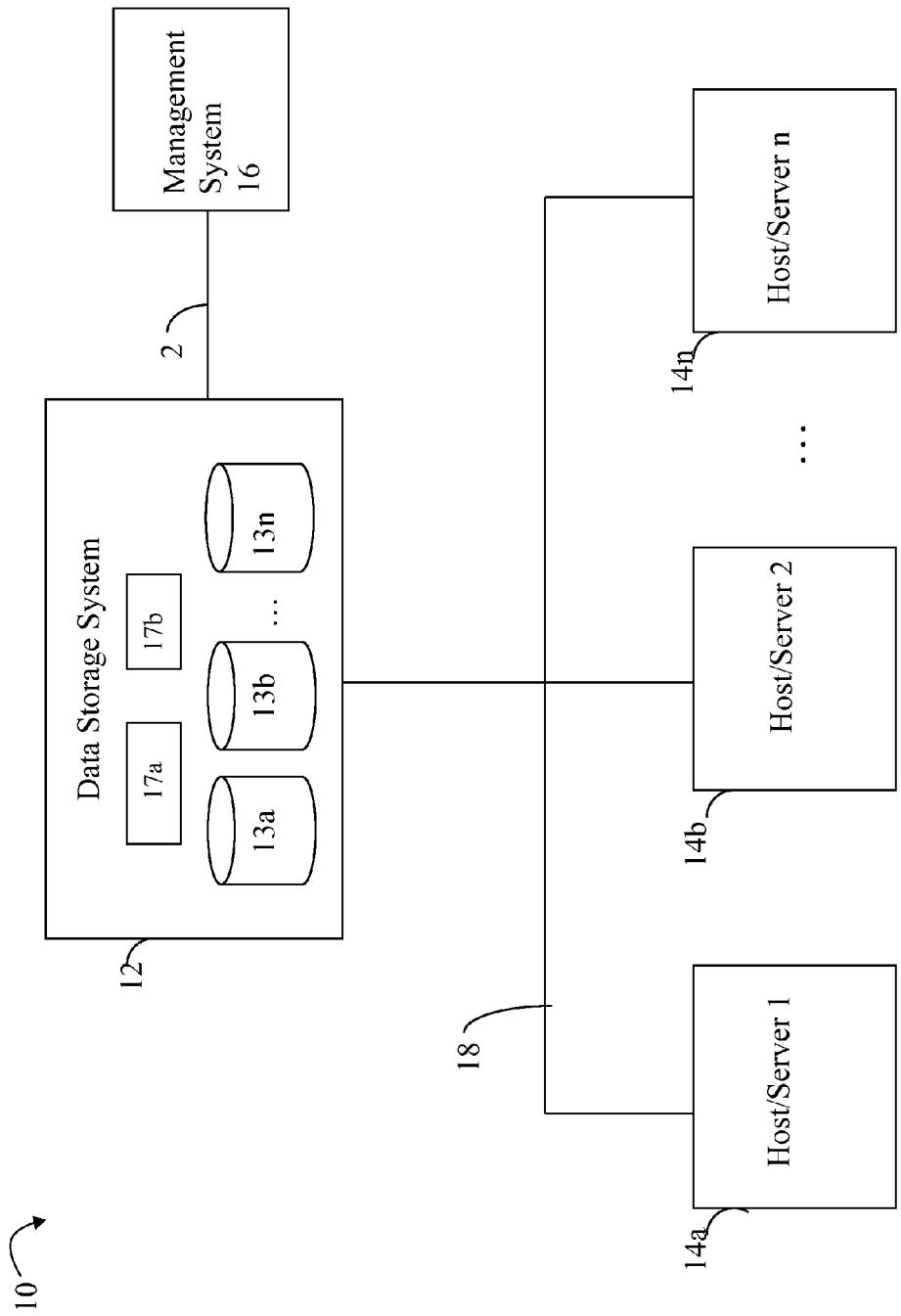
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein will be described with respect to a single unitary data storage system, such as single data storage array, including two storage processors or computer processing units. Techniques herein may be more generally use in connection with any one or more data storage system each including a different number of storage processors than as illustrated herein. The data storage system 12 may be a data storage array, such as a CLARiiON® data storage array by EMC Corporation of Hopkinton, Mass., including a plurality of data storage devices 16a-16n and two storage processors 17a, 17b. The storage processors (SPs) 17a, 17b may be computer processing units included in the data storage system for processing requests and commands. In connection with performing techniques herein, an embodiment of the data storage system may include multiple storage processors including more than two storage processors as described. The CLARiiON® data storage system mentioned above may include two storage processors 17a, 17b for performing processing in connection with servicing requests. Additionally, the two storage processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desk top computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
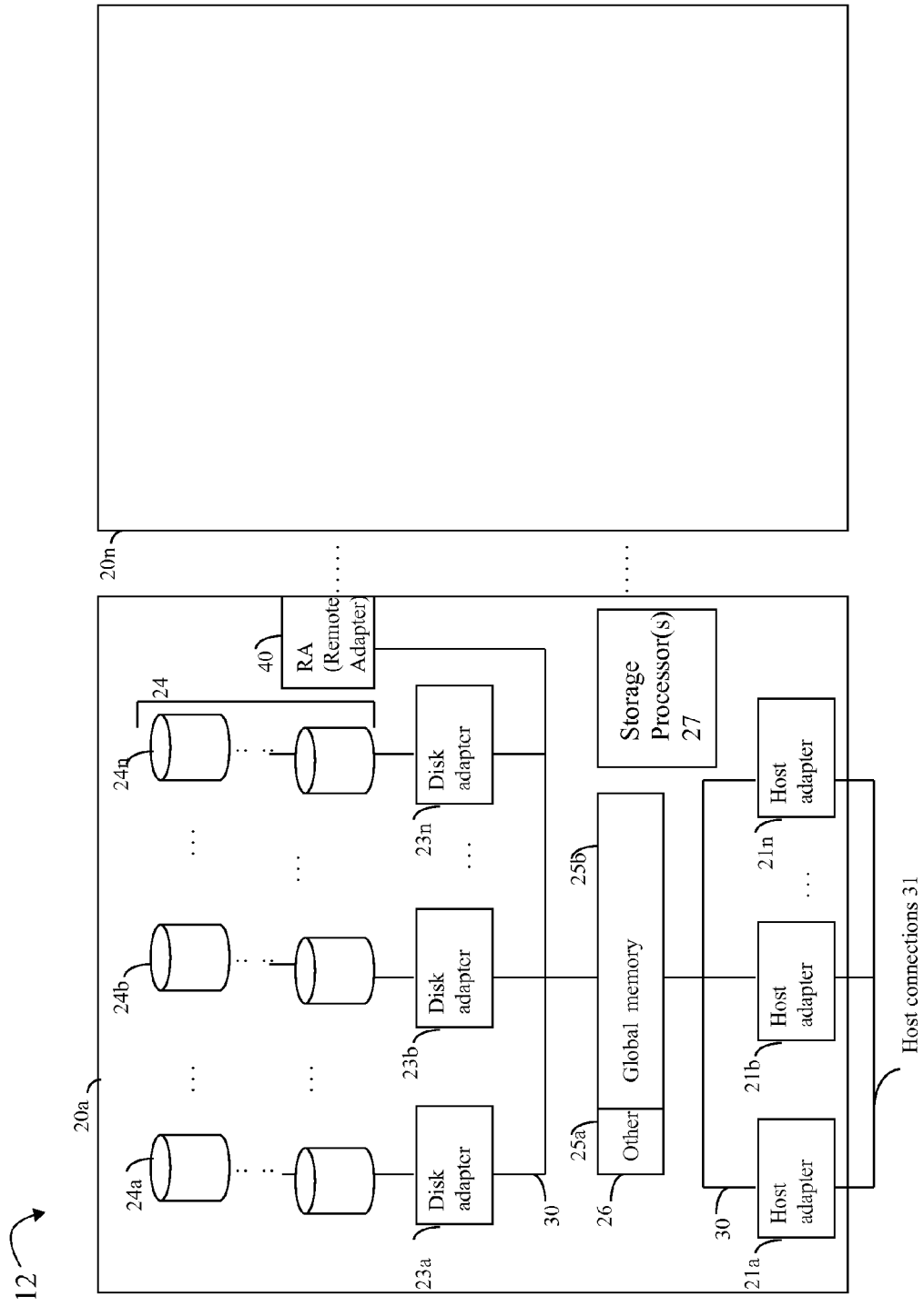
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

Figure 2A:
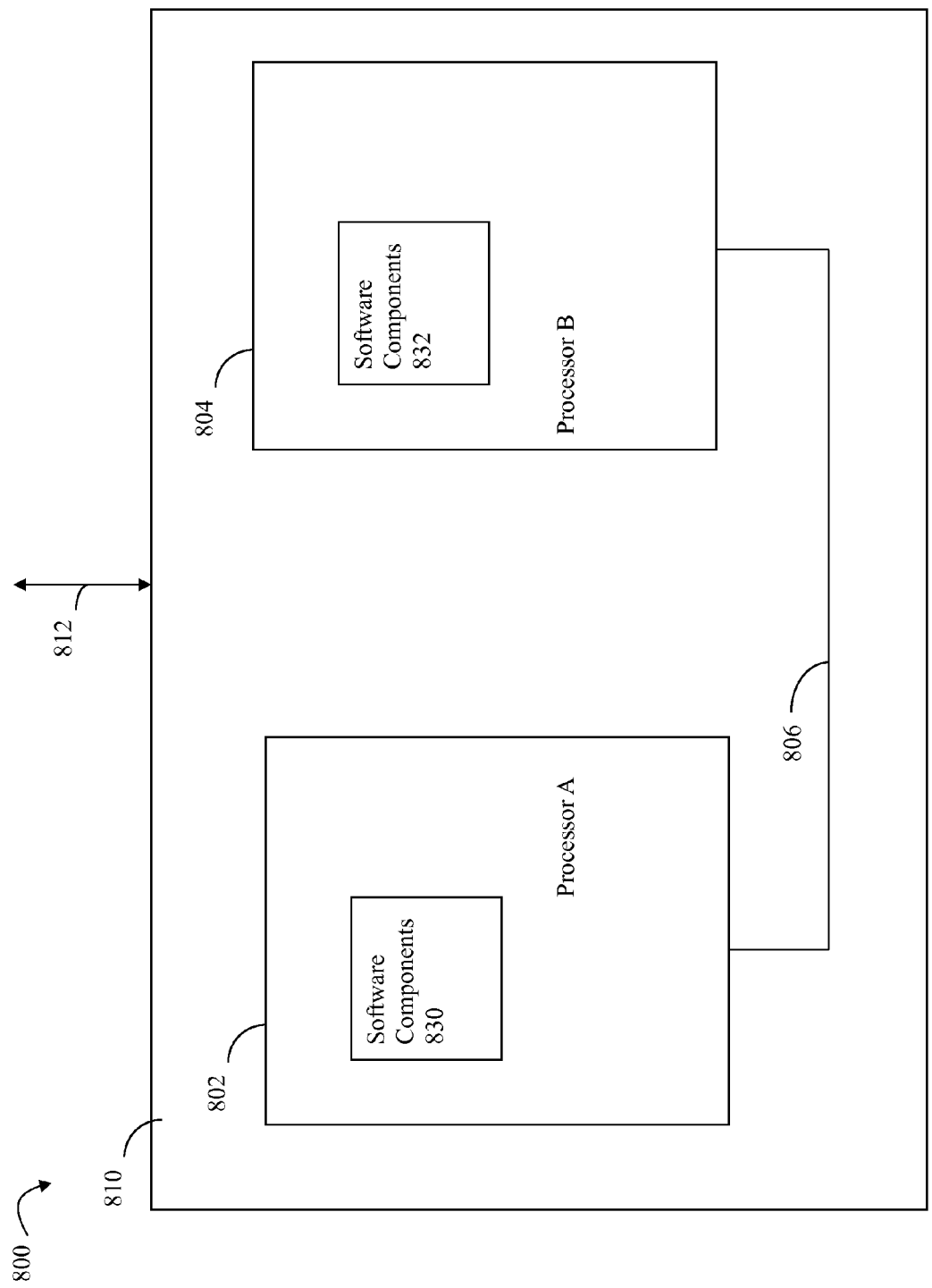
FIG. 2A is an example illustrating a data storage system including multiple storage system processors (SPs) in an embodiment in accordance with techniques herein.

Referring to FIG. 2A, shown is a block diagram of components that may be included in a data storage system 810. In the example 800, there are two SPs 802, 804 (also referred to as service or storage system processors A and B) although a data storage system and techniques herein may be used in an embodiment in which the data storage system includes more than two storage processors as mentioned above. Storage processor 802 includes software components or modules 830 executing thereon. Storage processor 804 includes software components or modules 832 executing thereon. Storage processor 802 and 804 may communicate using 806 which is described in more detail below. Element 812 may represent a single logical communication connection used for data storage system management transmissions between the data storage system 810 and one or more external clients. The software components or modules 830 and 832 may be software modules included in data storage system management software residing and executing on the data storage system 810 including software used in connection with communicating with external clients over network connection 812.

The two SPs 802, 804 may control the operation of the data storage system. The processors may be configured to process requests as may be received from the hosts, other data storage systems, management system, and other components connected thereto. Each of the processors 802, 804 may process received requests and operate independently and concurrently with respect to the other processor. In the example 800, each processor is illustrated as having one or more software modules (e.g., web server, drivers, other modules etc.) executing thereon. An embodiment may have a same set of one or more software modules executing on each processor so that either of the processors may service a received request. The example 800 may illustrate the state of the data storage system with software modules that are loaded as a result of booting the data storage system. In the example 800, the processors 802 and 804 have successfully completed the boot process leaving both 802 and 804 in what may be characterized as a healthy state with respect to data storage system management functionality. A storage processor may be characterized as being in the healthy state if the storage processor has the ability to service normal data storage system management messaging traffic over a communication connection, such as a network connection, used for data storage management. In other words, a processor may be characterized as healthy if it is determined that the processor is able to perform necessary processing and communications in connection with handling typical data storage system management transmissions over a connection used for normal data storage management messaging traffic. A processor may otherwise be characterized as being in an unhealthy state if any deficiency is determined with respect to the foregoing, such as a hardware and/or software problem, so that the processor is unable to be used in connection with handling data storage system management transmissions. Once booted, a processor may transition between the states of healthy and unhealthy in accordance with problems that may occur and/or be corrected over time.

With respect to data storage management requests, operations, and the like, as may be received from a client, such as the management system 16 of FIG. 1 in connection with the techniques herein, the client may interact with a designated one of the two processors 802, 804 over the communication connection 812.

In the example 800, instances of the software components 830, 832 executing, respectively, on processors 802, 804 may communicate over connection 806. The connection 806 may be a bus or other communication connection to facilitate inter-processor communication between the drivers. The connection 806 may be characterized as internal to the data storage system or local with respect to residing on the data storage system and used for communicating between components on the data storage system. The connection 806 may also be referred to as the common management interconnection (CMI) and may be characterized as part of an internal network over which inter-processor communications may occur. Thus, one of the storage processors may use connection 806 to communication with the other storage processor. Each SP may include code which facilitates communication with the other storage processor using the connection 806 for inter-storage processor communication.

The processors 802, 804 may also communicate over another connection 812. The connection 812 may represent a TCP/IP or other network connection over which instances of the software components 830, 832 on processors 802, 804 (respectively) may communicate with other externally networked components. Connection 812 may correspond to a single logical connection used, for example, to communicate with a client such as the management system 16 running a web browser displaying a GUI (graphical user interface). The connection 812 may be characterized as a single communication connection between the data storage system and the management system over which the user on the management system 16 may interact with the data storage system in performing data storage system management tasks. The processors 802, 804 may send and/or receive transmissions over connection 812 from the management system 16 of FIG. 1. In one embodiment, the connection 812 may be part of a dedicated LAN connection for management operations. Host I/O requests may be received at the data storage system on different incoming ports such as, for example, Fibre channel or iSCSI ports not illustrated.

It should be noted that the data storage system 810 of the example 800 includes other components, such as storage devices, which are omitted from the example 800 for simplicity in illustrating the dual processors 802, 804.

I/O operations performed in a data storage system may include I/O operations of a first type which are received by the data storage system from an external client, such as a host. Depending on the data storage configuration, the single host I/O operation, such as for a write operation, may result in more than one write operation to one or more physical drives on the data storage system. For example, if the write is directed to a logical device configured to have two mirrors, then a write is performed to each of the mirrored devices of the storage system.

Figure 3:
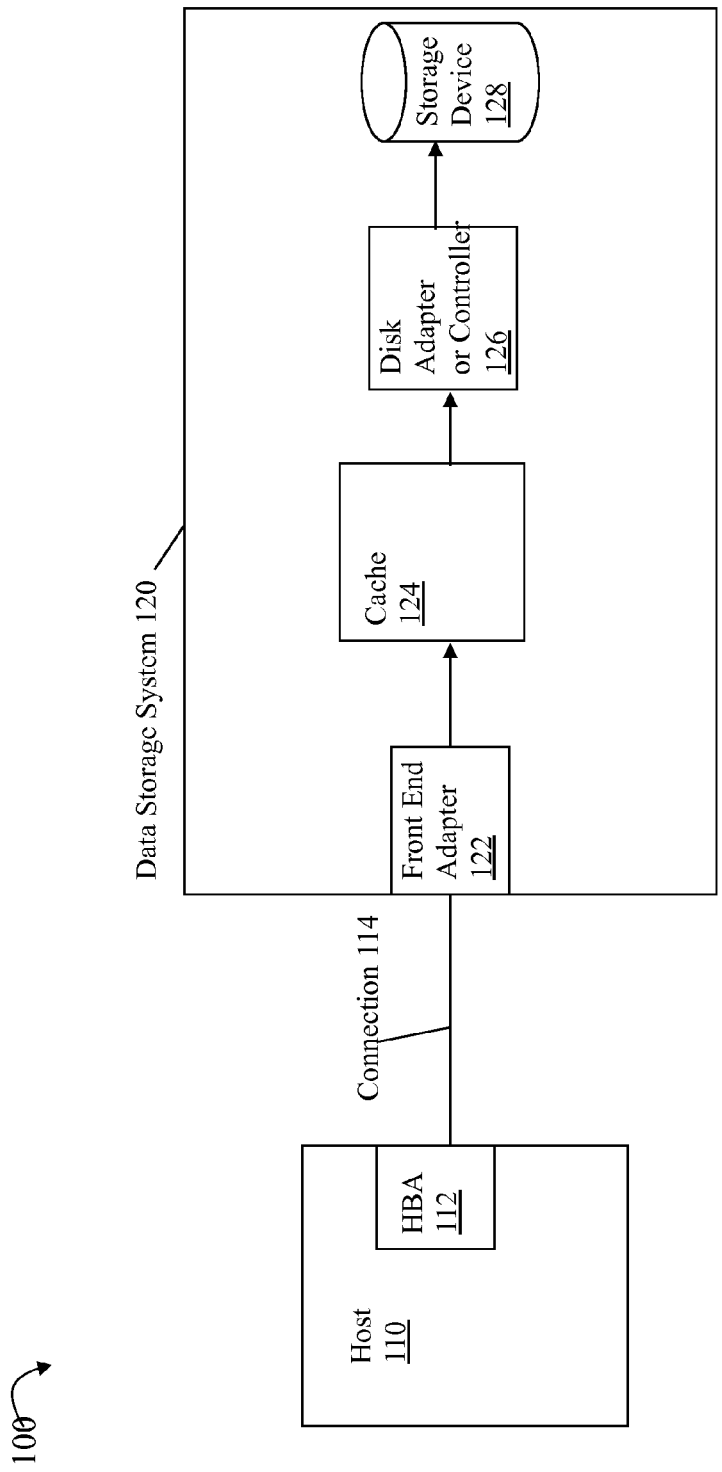
FIG. 3 is an example illustrating a request that may be issued from a host to the data storage system in an embodiment in accordance with techniques herein.

With reference to FIG. 3, shown is an example 100 illustrating components of a system that may be used in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the type described above issued by the client. The single client I/O operation may result in actually writing data to one or more storage devices depending on how the device to which the I/O is directed is configured.

Figure 4:
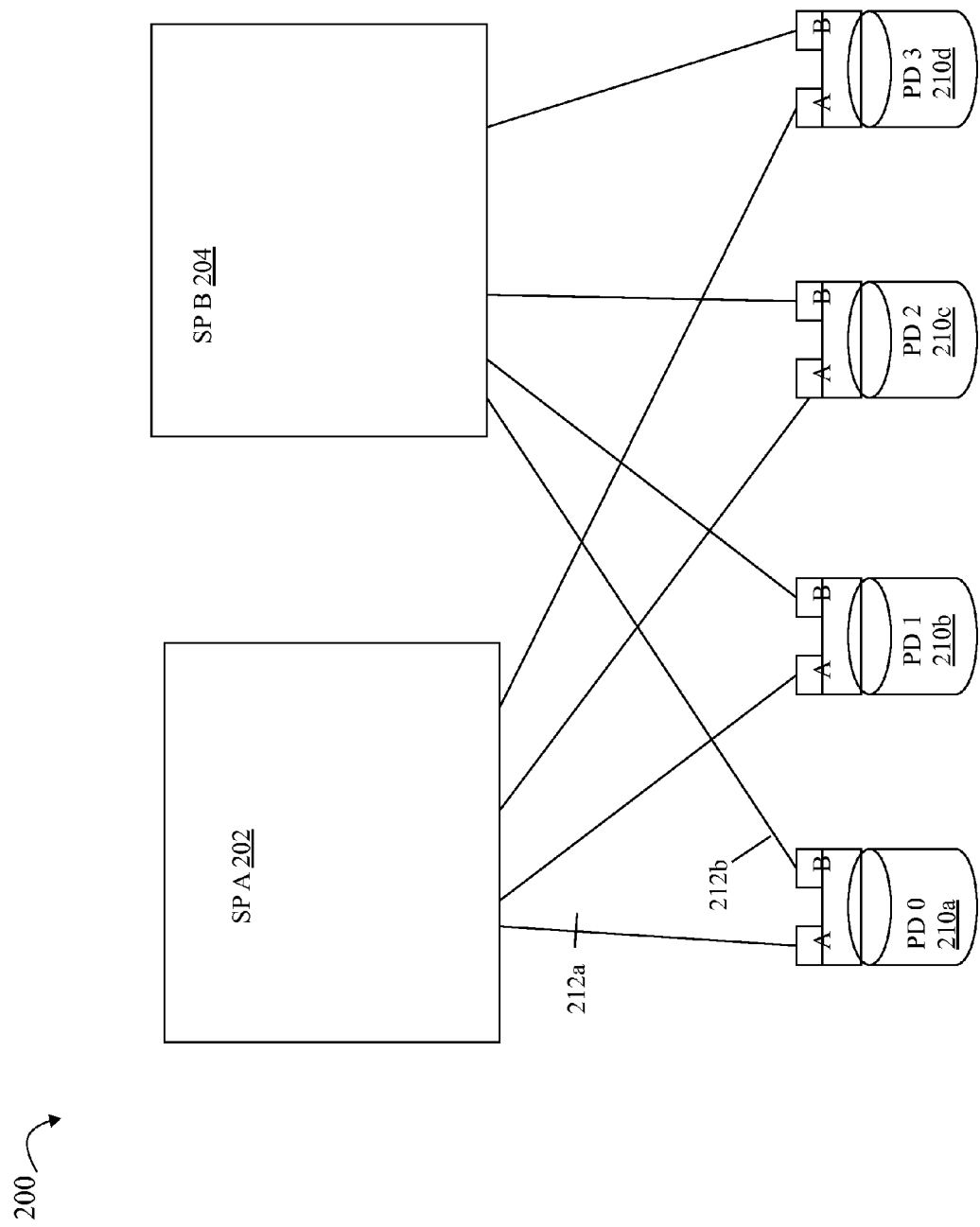
FIG. 4 is an example illustrating the plurality of SPs in the data storage system accessing a same set of physical drives in an embodiment in accordance with techniques herein.

Referring to FIG. 4, shown is an example illustrating in more detail how each SP of the data storage system may access a same set of physical drives in an embodiment in accordance with techniques herein. The example 200 includes two SPs—denoted SP A 202 and SP B 204, and a plurality of physical drives (PDs) 210a-210d. This example illustrates only 4 PDs for simplicity but in actual systems in accordance with techniques herein, a data storage system may include hundreds and even thousand of PDs. The example 200 illustrates how each of the SPs 202, 204 may be configured to access a same set of PDS 210a-210d using a different one of the ports A and B of each of the PDs 210a-210d. For example, SP A 202 performs processing to issue I/O operations to PD 0 210a using port A of 210a as represented by connection 212a. In a similar manner SP B 204 performs processing to issue I/O operations to PD 0 210a using port B of 210a as represented by connection 212b. Each of the SPs 202, 204 may be similarly configured to access each of 210b-210d using different ports. The foregoing may be used for purposes of redundancy and high availability provided by the data storage system, for example, so that each SP may handle I/Os to any of the PDs.

As described in more detail in following paragraphs and figures, each SP 202, 204 may have its own instance of a data model, such as a object model, that represents various logical and physical aspects of the data storage configuration. The data model may include objects representing the physical drives (PDs). Each PD may have a corresponding PDO (physical drive object). Furthermore, associated with each PDO may be a PVO (provision drive object) which is used in connection with representing and handling aspects of storage provisioning and other operations with respect the underlying PDO and PD. For example, a PVO may be used to represent aspects of provisioned physical storage of a physical drive (as represented by its PDO associated with the PVO) such as for RAID groups (e.g. indicating that the PD is a member of a particular RAID group). As described in more detail in following paragraphs, the PVO may be used in connection with coordinating performing a firmware update of a PD associated with the PVO. At some points in processing in connection with certain operations such as for the firmware update, it may be necessary for objects used by each SP as related to a single PD (e.g., PDO and PVO objects as used by each of SP A and SP B) to be aware of each other and also be aware of the current state of all such objects in order to perform synchronization of processing steps are may be necessary in connection with performing an operation such as an upgrade or update the firmware of PDs. For example, I/O operations directed to the PD are synchronized or controlled such that, while SP A is controlling the firmware update to the PD, SP A and SP B temporarily suspend issuing new I/Os to the PD. Additionally, SP B is made aware of the state of the firmware update processing to ensure that SP B does not interpret the unavailability of the PD (as may the case when performing the firmware update) as another problem with the PD and thereby attempt to take corrective actions for the PD which may interrupt the firmware update. As described in more detail below, the PVOs may be used in connection with techniques herein to drive the firmware updating of PDs associated with the PVOs. In one embodiment, it should be noted that if there is no PVD associated with a PD, the PD may not have yet been provisioned and configured into other logical entities, such as into RAID groups, LUNs, and the like, for use in storing client data.

Each PD is physical hardware including physical storage media and other components such as a CPU and firmware (machine executable code) stored in a memory of the PD. The firmware of the PD may be used to facilitate communications such as with the DA or disk controller. For example, where a PD includes a rotating disk drive, the firmware may include commands to control positioning of a drive arm or head to a specific physical position (e.g., radial distance from the center, rotational position within a track). The firmware may vary with each particular different PD as may be included in a data storage system. For example, the firmware for a PD may vary with the vendor or physical drive manufacturer, the particular drive model or type for a particular vendor, the drive interface, and the like. As such one or more physical drive characteristics such as the foregoing may be used to determine the particular firmware. Additionally, firmware may have an associated version number so as the firmware is upgraded or updated, the version number of the firmware installed for a particular PD may change (e.g., increase).

One of the operations that may need to be performed for PDs at various points in time may be a firmware update or upgrade. A data storage system may include different PDs having varying sets of characteristics or properties thereby indicating that multiple sets of firmware may be updated. For example, a first set of PDs may be from a first vendor and a second set of PDs may be from a second different vendor where the first set of PDs use first firmware provided by the first vendor and the second set of PDs use second firmware provided by the second vendor. Firmware updates to the first set of PDs may be performed at a first point in time which is different from firmware updates performed to the second set of PDs.

One problem in connection with firmware updates to the PDs is that the firmware update operation is disruptive and the PD cannot service I/Os while such firmware updating is performed/in progress for the PD. A data storage system may have hundreds and thousands of these PDs so it may be impractical and/or undesirable to perform the firmware upgrade of the PDs all sequentially. In accordance with techniques herein as described in following paragraphs, PD firmware upgrades complete within a reasonable time by having the firmware upgrades occur in parallel but in a decentralized distributed manner. Additionally, in accordance with techniques herein, the PD firmware upgrades occur in a manner that is transparent to the host or other client accessing data on the PDs (e.g., providing continuous access of the PD to the host or client without the host having I/O processing disrupted or stopped from the host's perspective). Furthermore, there may be particular points in time in accordance with one or more data storage system policies at which it is undesirable to perform the firmware upgrade to specific PDs. For example, if a PD is a member of a RAID group currently experiencing an internal RAID group rebuild (e.g., such as to recover data and/or parity information from a first RAID group drive member using information from one or more other RAID group drive members), it may be undesirable to perform the firmware upgrade to one or more PDs of the RAID group depending on the current state of the RAID group. As another example, two PDs may be included in a RAID-1 group whereby PD1 and PD2 are mirror copies (data replicates) of each other. In this case, if PD1 is unavailable for servicing I/Os (e.g., since PD1 has failed, is currently having its firmware updated, or currently undergoing reconstruction such as by restoring/copying data to PD1 from its mirror PD2), then it may be desirable to defer performing the firmware update to PD2 (thereby making PD 2 unavailable) until PD1 is available and able to service I/O operations. The techniques herein take into account such policies when deciding when to perform firmware updates to the different PDs in a data storage system.

Some existing systems which do not utilize techniques herein may be characterized as disruptive to the hosts and other clients and may consume more than a desirable amount of time for all needed firmware updates to complete. In connection with techniques herein, advantages will be appreciated by those of ordinary skill in the art such as performing timely coordinated and efficient firmware updates to the PDs without the host losing connectivity to the data storage system.

Figure 5:
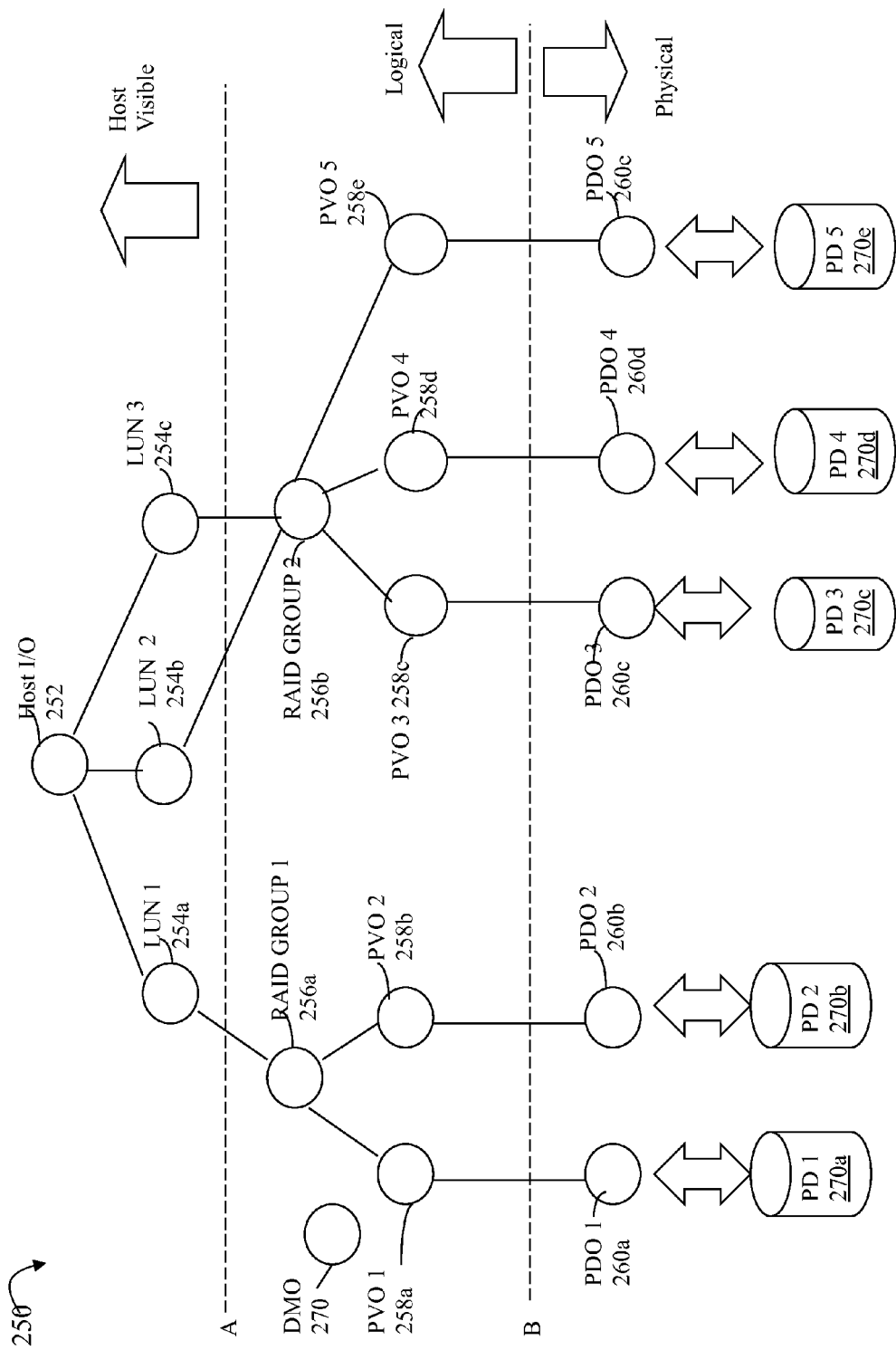
FIG. 5 is an example illustrating objects as may be included in an object model of each SP in an embodiment in accordance with techniques herein.

Referring to FIG. 5, shown is an example of a graph that may be used in an embodiment in accordance with techniques herein to represent the data model as may be maintained on each SP. The example 250 includes a graph with nodes and edges between the nodes. The graph in this example forms a tree having a root node 252 at a first level, nodes 254a-254c at a second level, nodes 256a-256b at a third level, nodes 208a-258e at a fourth level and leaf nodes 260a-260e at a fifth level. The graph may be a representation of logical and/or physical components in the data storage system with the root node 252 corresponding to an aggregator or external interface node for the data storage system, or more specifically, an interface node to the backend of the data storage system. Each node in the graph other than the root node represents an object associated with a corresponding physical or logical entity in the data storage system. The leaf nodes at the fifth level correspond to objects associated with physical storage devices, such as rotating disk drives (e.g., Fibre channel drives, SATA drives) or SSDs (solid state storage devices such as comprising flash-based memory). Nodes at levels other than the first level (root node) and bottom most level (level 5 including leaf nodes 260a-260e) may correspond to, for example, RAID groups, drives or members of a RAID group, LUNs, and the like. In this example, nodes 254a-254c correspond, respectively, to objects associated with LUNs 1-3, nodes 256a-256b correspond, respectively, to objects associated with RAID GROUPS 1 and 2, nodes 258a and 258b correspond to PVOs associated with RAID drives or members of RAID GROUP 1, nodes 258c-258e correspond to PVOs associated with RAID drives or members of RAID GROUP 2, and nodes 260a-260e correspond to physical device objects (PDOs) associated with physical storage devices (PDs) 270a-e. Each PDO may be associated with a single PD, and each PDO may be associated with a single PVO. To further illustrate, object 256a may represent a mirroring configuration object such as for a RAID-1 configuration whereby PD 1 represented by PDO 260a and PD2 represented by PDO 260b are mirrors of each other.

A path in the graph may correspond to an I/O path over which an I/O operation may be forwarded to a physical device (PD) for processing. For example, a host I/O operation directed to LUN 3 to write data may result in writing user data and/or parity information to a portion of PD5 forwarded along the path represented by nodes 252, 254c, 256b, 258e, 260e. The foregoing may be a complete path from the root to a leaf node. An I/O operation may be forwarded along a path from a first node which is at a level M in the graph, M>1 (e.g., the root node is at level 1), to one of its descendant nodes in the graph, such as one of the leaf nodes or other nodes at a level >M in the graph.

Also included in the example 250 are dashed lines denoted as A and B. Portions of the graph above line A may represent those entities of the data storage system which are visible to the host or other external client. For example, the host may send I/O requests directed to one or more LUNs. The host does not have any knowledge regarding underlying RAID groups that may be included in an embodiment. Nodes below line A may correspond to entities known or exposed within the data storage system, but not to the host. Dashed line B represents the partitioning of the graph into nodes corresponding to physical and logical entities. Nodes above line B (other than the root) may correspond to logical entities (e.g., LUNs, RAID groups, RAID drives or members) of the data storage system. Nodes below line B may correspond to physical entities, such as physical storage devices, of the data storage system.

As mentioned above, each of SP A and SP B may include its own set of objects such as illustrated in 250. Also included in the set of objects 250 of each SP may be a drive management object (DMO). The DMO manages the PDs and may be included in a software package, framework or service, such as an ESP (environmental service package), that provides functionality for management of hardware components of the data storage system. In connection with techniques as described in following paragraphs, the DMO may send different types of requests, such as for performing PD firmware updates, to one or more PVOs. Each PVO in SP A for a PD then coordinates locally with its counterpart or partner PVO in SP B for the same PD regarding whether and when to perform the firmware upgrade to the PD. In connection with performing a firmware update of one or more particular PDs, the DMO from either SP A or SP B may initiate the firmware upgrade request and may send such request to all affected PVOs. s described in more detail in following paragraphs, the quiescing and coordination of I/Os is done at the PVO level for each associated PD across both SPs.

What will now be described is an illustrative examples of techniques herein for performing the firmware update to one or more PDs. In the following example, assume that there are two SPs—SP A and SP B—of the data storage system and that SP A initiates the performing of the firmware update processing described below.

Figure 6:
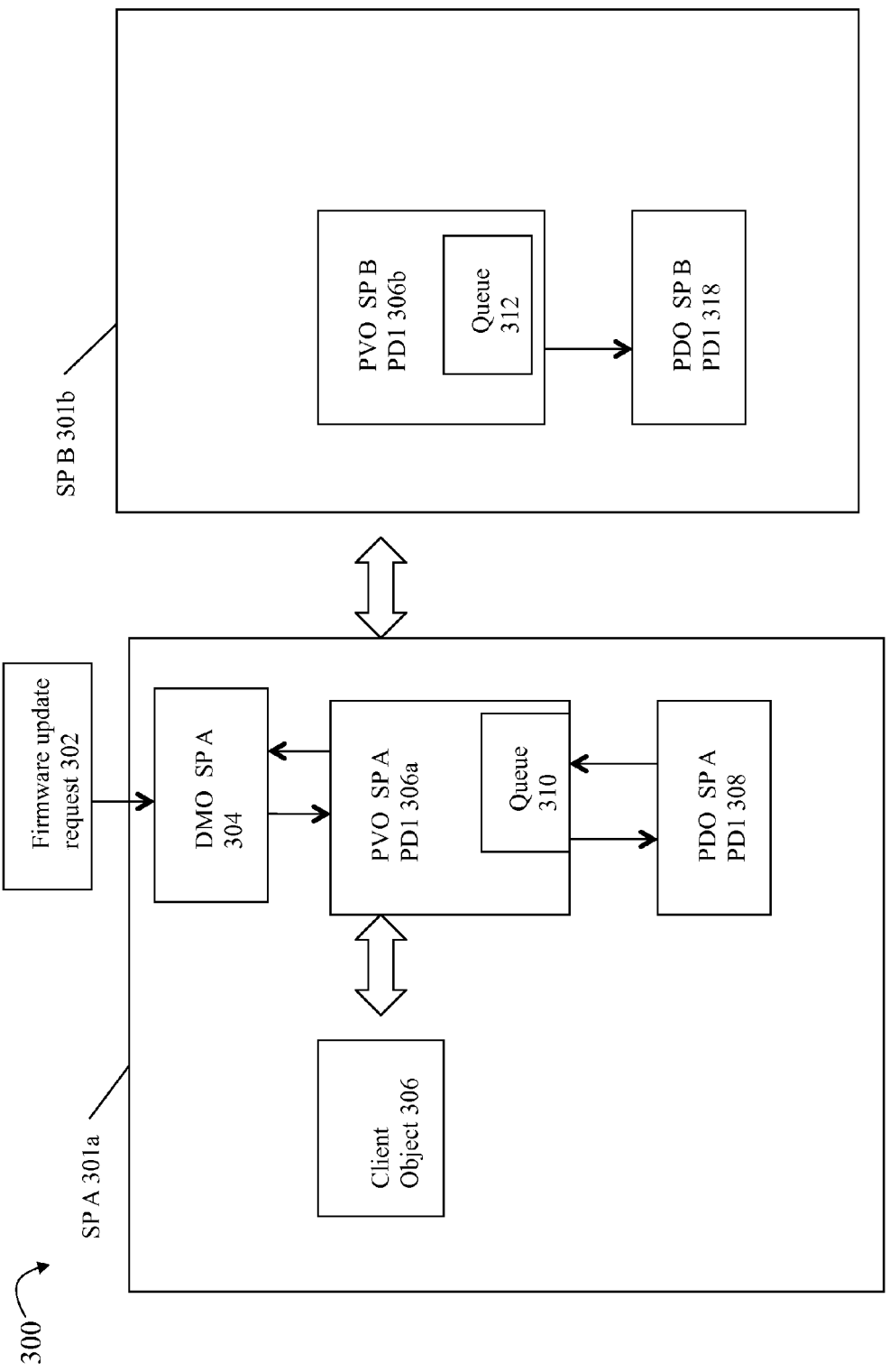
FIGS. 6 and 9 are examples illustrating interactions and data flow between various components of the SPs in an embodiment in accordance with techniques herein.

Referring to FIG. 6, show is an example 300 illustrating use of techniques herein as may be performed in an embodiment including SP A 301a and SP B 301b. The components included in each of SP A 301a and SP B 301b may denote a portion of components of each SP's data model used in connection with following description to illustrate use of techniques herein.

The DMO 304 of SP A may receive a request 302 to update firmware of one or more PDs. The DMO 304 may perform processing to determine the one or more PDs affected by the requested update. The DMO 304 receives the request 302 to update the firmware where the request 302 may include update criteria used to identify the affected PDs and PDOs matching such criteria. For example, the update criteria may identify any one or more of drive serial number(s), the drive vendor, drive batch or lot number(s), firmware version of the upgrade, and the like. For example, in one embodiment, the update criteria may include one or more TLA (top level assembly line) numbers to which the firmware update is applicable. The TLA may be akin to a part or serial number of a drive and may be comprised of a first portion denoting the PD model, a second portion denoting the PD capacity, and a third portion denoting the PD interface (e.g., fiber channel, SCSI). Each TLA number may identify a batch or group of PDs to which the firmware update is to be applied. Generally, the update criteria may be specified in any suitable manner the foregoing of which are some examples.

The DMO 304 of SP A determines which one or more PDs match the update criteria and then sends the update request to the selected matching PVOs associated with the matching PDs. Subsequent processing steps performed in accordance with techniques herein may be characterized as decentralized in that each PVO for a matching PD may drive the individual effort regarding the firmware update of the PD associated with the PVO.

The DMO 304 may perform such a determination regarding which PDs the request 302 is to be applied by determining a match between the update criteria of 302 and PD properties or attributes. In one embodiment, the PD properties or attributes may be stored as object attributes of the PVO and/or PDO associated with the PD. Such PD properties may be obtained, for example, from a cache of previously stored attributes, obtained directly from the PVO for a PD which in turn requests such information from the associated PDO, and the like.

At this point, the firmware update to be applied to matching PDs may be stored in a memory of the data storage system. The DMO 304 sends the request to each PVO associated with a PD to which the firmware update is to be applied whereby such request may also identify the memory location including the firmware update. In other embodiments, the firmware update may be stored in a known predefined location from which the contents are obtained.

With reference to FIG. 6, DMO 304 may issue the request to PVO 306*a* of SP A whereby PVO 306*a* is associated with PDO 308 of SP A and the physical device denoted as PD1 meeting the update criteria of the request 302. For simplicity of illustration, the DMO 304 of SP A is shown as only communicating with a single PVO 306*a* of SP A for simplicity. In actual implementation, the request 302 may be applicable to generally any number of PDs in the system meeting the update criteria of the request 302.

PVO 306*a* performs processing to determine whether to perform firmware update for PD 1 at the current point in time. In one embodiment such processing may include the PVO 206*a* determining whether it is allowed to perform the firmware update now in accordance with one or more policies of the data storage system. The PVO 306*a* may issue a request to a client object 306 at a higher level in the object model (such as illustrated in FIG. 5) than the PVO 306*a*. For example, consistent with the data model such as illustrated in FIG. 5, the PVO 306*a* may issue a request or query to a RAID group object or mirror object (e.g., at level 3 such as represented by 256*a*) inquiring as to whether the PVO 306*a* is allowed to proceed with the firmware update to PD 1. For example, assume that PD1 and PD2 are the mirrored physical drives with PD1 being associated with PVO 306*a* and PDO 308. If PVO 306*a* issues a request to a mirror object as the client object 306, the mirror object may deny the request for the firmware update to PD1 if the mirrored PD2 is currently unavailable. The particular criteria used by the client object as to whether to grant or deny the request for the firmware update may vary with the particular client object and policy/ies of the data storage system. In response to inquiry as to whether it is allowable to perform the firmware update to PD1 at the current time, the PVO 306*a* may receive from the client object 306 a response indicating that such request is granted (e.g., may proceed with the firmware update processing) or otherwise denied (e.g., do not proceed further with the firmware update processing at this time). If denied, the PVO 306*a* may reissue the request to the client object 306 at one or more subsequent points in time until granted. In one embodiment, the PVO 306*a* may poll the client object 306 at repeated occurrences of a predetermined time period until such request is granted by the client object 306. It should be noted that a PD such as PD1 is unavailable, offline and otherwise not able to service I/Os during the time that the PD is having its firmware updated. Thus, the client object 306 may generally deny the request for the firmware update from the PVO 306*a* if the client object 306 determines that the PD1 (associated with the requesting PVO 306*a* to which the firmware update is to be applied) should not be offline or unavailable at this time.

Once the PVO 306*a* receives an response granting the request to perform the firmware update from the client object 306, the client object 306, such as the above-mentioned mirror object, may mark in its state information that the firmware update is in progress/granted for PD1. The client mirror object may choose not to grant a subsequent request to perform the firmware update to the mirrored PD, PD2, until such time as the firmware update to PD1 has been completed and PD1 is available to service I/Os while PD2 is offline/unavailable during the firmware update. Thus, the client mirror object may use such saved state information regarding firmware updates in progress in connection with granting or denying other firmware update requests from other PVOs associated with other PDOs.

The PVO 306*a* that received the response granting the firmware update for PD 1 now sends a command or message to its counterpart or peer PVO 306*b* on SP B 301*b* whereby both PVOs 306*a*, 306*b* are associated with the same PD1. PVO 306*b* on SP B knows that the request has been granted on SP A at this point in processing. PVO 306*b* of SP B sends command to its PDO 318 on SP B to indicate that the firmware update is in progress/granted on SP A. In this manner, SP B 301*b* is informed that SP A 301*a* is handling/controlling the firmware update to the PD1 associated with PVOs 306*a*, 306*b*. Thus, objects in the object model of SP B are now informed that there may be state changes in the PD consistent with the firmware update processing. If SP B was not aware that such a firmware update was ongoing, SP B may try to take corrective actions based on the assumption that there may be other problems with the PD.

Additionally, at this point, each of the PVOs 306*a*, 306*b* perform processing to hold or queue all new incoming I/Os directed to the PD1 at the PVD level during the firmware updating/download of PD1. Queue 310 may represent the buffer location where such new incoming I/Os for PD1 as received by SP A 301*a* are temporarily stored during the firmware update of PD1. Queue 311 may represent the buffer location where such new incoming I/Os for PD1 as received by SP B 301*b* are temporarily stored during the firmware update of PD1. Additionally, each of the PVOs 306*a*, 306*b* allow any in-progress or in-flight I/Os below the PVO level to complete prior to downloading the firmware to the PD1. In connection with in-progress I/Os below the PVO level, I/Os may be buffered at one or more locations. For example, PDs may have their own internal local buffer where in-progress I/Os may accumulate I/Os. Additionally, in-progress I/Os may also be buffered by the DA in the DA's internal memory which are waiting to be sent to the PD for processing. Thus, generally, an in-progress or inflight I/O operation may be one that has been issued by the PVO object to a lower-level PDO but has not yet completed. In this manner, any new I/Os are queued at the PVO level but there may be other I/Os in progress as stored in the PD internal buffer or DA's buffer. In accordance with techniques herein, the firmware update may wait until all such in-progress I/Os for both SP A and SP B have been drained or completed before commencing the download of the firmware to the PD. It should be noted that other embodiments may include one or more different or other buffers than as described herein which may include I/Os in-progress.

Thus, SP B 301*b* holds any new I/Os at PVO level as may be stored in queue 312 and SP B 301*b* completes in-progress buffered I/Os for the PD1. Once the in-progress I/Os for PD1 on SP B 301*b* have completed (e.g., drained), the PVO 302*b* sends message to its counterpart PVO 306*a* indicating that SP B has completed such processing in preparation for the firmware update. PVO 306*a* of SP A 301*a* performs processing similar to that as just described for SP B whereby PVO 306*a* similarly holds all new incoming I/Os at the PVO level in queue 310 and drains in-progress buffered I/Os to the PD1. It should be noted that the PVO 306*a* of SP A may perform the foregoing to hold new incoming I/Os and drain in-progress I/Os sequentially following completion by PVO 306*b* of SP B. Alternatively, an embodiment may have both PVOs 306*a* and 306*b*, respectively, of SP A and SP B for PD1 perform such processing in parallel to queue new I/Os at the PVO level and drain in-progress I/Os. In any case, PVO 306*b* of SP B notifies PVO 306*a* of SP A when it has completed draining its in-progress I/Os while also holding any new incoming I/Os for PD1. An embodiment may refer to firmware update preparation processing as including the holding of new incoming I/Os at the PVO level and draining in-progress I/Os.

Once the PVOs 306*a*, 306*b* have held new I/Os as the PVO level and completed draining all in-progress I/Os to PD1, PVO 306*a* may notify its associated PDO 308 to start the firmware download to PD1. Once the firmware download has successfully completed, PDO 308 notifies PVO 306*a*. In response, PVO 306*a* performs processing to resume I/Os to the PD1. As part of this resumption of I/O processing, PVO 306*a* may process I/Os included in its queue 306*a* and also allow new incoming I/O requests for PD1 to be processed. PVO 306*a* also sends a message to its counterpart PVO 306*b* for PD1 to also similarly resume I/Os since the firmware update to PD1 has successfully completed. In response, PVO 306*b* resumes I/O processing to PD1 by processing any I/Os included in its queue 312 and allowing new incoming I/O requests for PD1 to be processed.

Once PVO 306*a* is notified that the firmware update to PD1 has completed, PVO 306*a* may return an acknowledgement to the DMO 304 that the firmware update for PD1 has completed successfully. The DMO 304 may determine that the request 302 has been serviced when it has received such an acknowledgement from all PVOs like 306*a* associated with PDs which met the update criteria of the request 302. In response to receiving all the expected acknowledgements from PVOs, DMO 304 may return a successful completion response to the requesting host.

In connection with the foregoing, the firmware of each affected PD may be updated independently of, and in parallel with, other affected PDs. Layers in the object model above the PVO level may have control in connection with determining whether and when to perform the firmware update for each PD is performed. Such determination may be made in accordance with defined data storage system policies. The policies may be enforced by such higher level objects above the PVOs such as using objects representing logical constructs such as a RAID group or mirror. For example, an embodiment may not want to perform the firmware update to more than two PDs of a RAID-6 group based on a tolerance for recovery using rebuild procedures internal to the RAID group and such a policy may be enforced by a RAID-level or RAID group object (e.g., level 3 of FIG. 5). An embodiment may also define another policy as described above in connection with PDs in mirrored configurations which may also be enforced by the higher level client mirror object (e.g., level 3 of FIG. 5). As another example with reference to FIG. 5, an embodiment may have an N-way mirror policy and an object at level 3 may exist to represent the N-way mirror (N physical drives which are mirrors). Such an object may enforce a policy to allow in-progress firmware updates for up to N−1 PDs included in the mirrored configuration.

The techniques herein may be characterized as a coordinated decentralized and distributed approach to perform firmware updates of PDs. There is coordination to a point by the DMO which then allows for decentralized decision making on a per PD basis as to whether and when to perform a firmware update.

Figure 7:
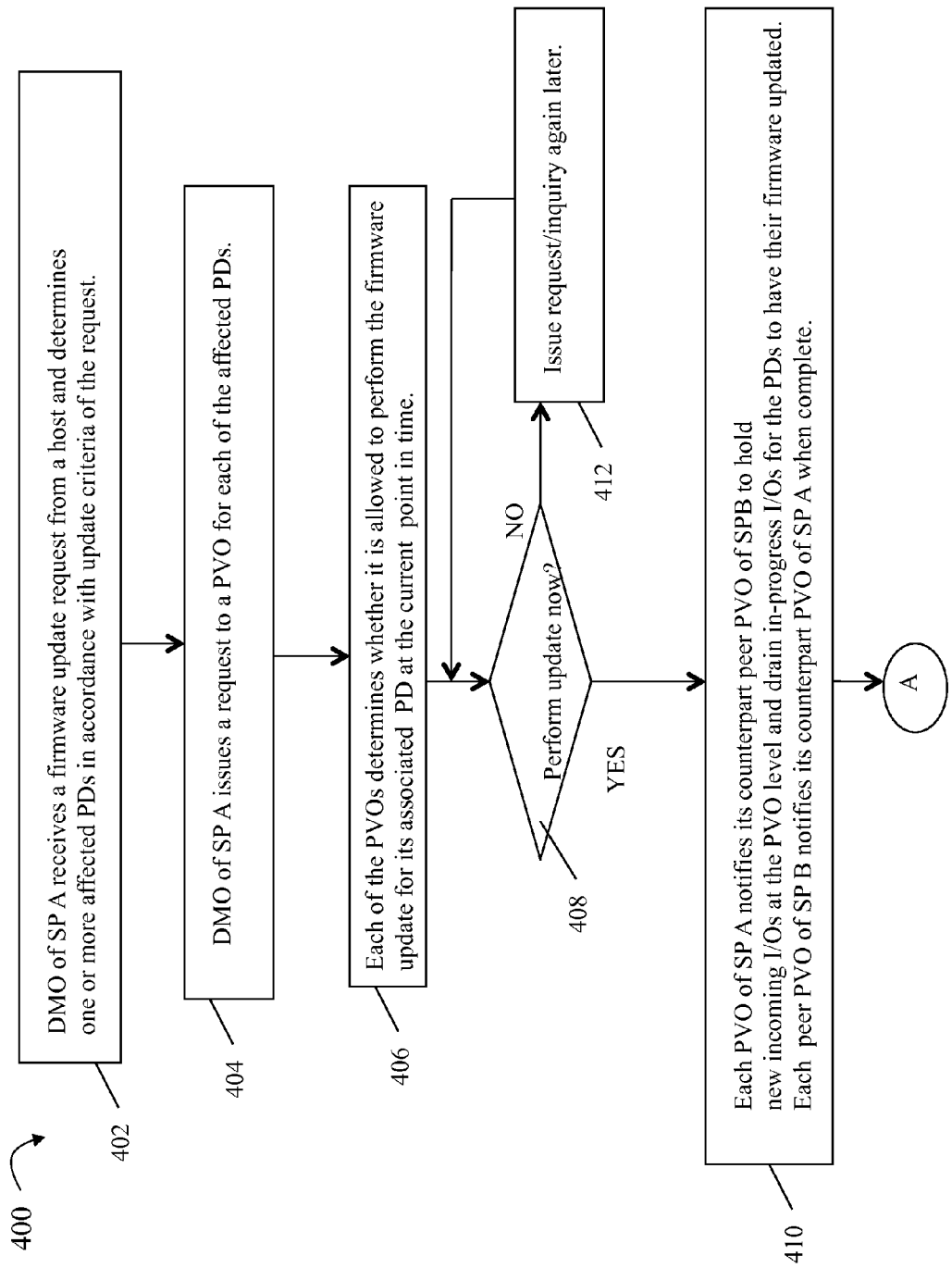
FIGS. 7 and 8 illustrate a flowchart of processing steps as may be performed in an embodiment in accordance with techniques herein.
Figure 8:
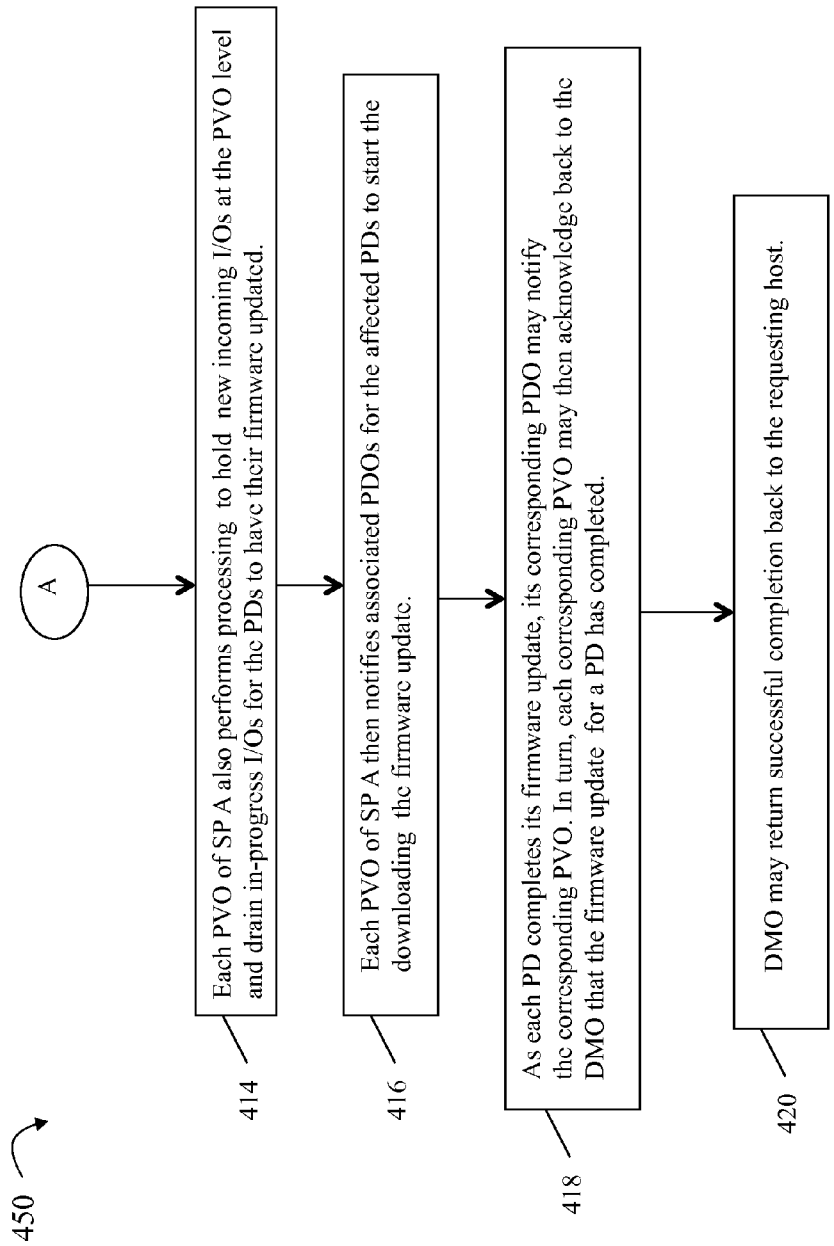

Referring to FIGS. 7-8, shown is a flowchart of processing steps that may be performed in an embodiment in accordance with techniques herein. The flowchart of FIGS. 7-8 summarizes processing described above. At step 402, the DMO of one of the SPs such as SP A may receive a firmware update request from a host, management system or other external data storage system client to update the firmware of one or more physical drives. In step 402, the DMO determines the one or more affects PDs in accordance with update criteria of the request. At step 404, the DMO of SP A issues a request to a PVO for each of the affected PDs. As described above, the firmware update request may affect multiple PDs and in such a case multiple PVOs corresponding to the affected PDs are so notified in step 404. In step 406, each of the PVOs notified in step 406 determines whether it is allowed to perform the firmware update for its associated PD at the current point in time. Step 406 may include the PVO, for example, issuing a request or inquiry to another object which may either deny or grant such a request to update the firmware of a particular PD at the current time. At step 408, a determination is made by each PVO as to whether to perform the firmware update for its associated PD at the current time. If step 408 evaluates to no, control proceeds to step 412 to issue the request or inquiry again at a later point in time. Control then returns to step 408. It should be noted that the performing of step 408 and also steps 410, 412, 414 and 416 occurs independently and in parallel for each PVO of step 406. If step 408 evaluates to yes for a PVO, control proceeds to step 412. At step 412, each PVO of SP A notifies its counterpart peer PVO of SP B to hold new incoming I/Os at the PVO level and drain in-progress I/Os for PDs having their firmware updated. Each peer PVO of SP B notifies its counterpart PVO of SP A when complete. At step 414, each PVO of SP A also performs processing to hold new incoming I/Os at the PV level and drain in-progress I/Os for the PDs having their firmware updated. At step 416, each PVO of SP A notifies associated PDOs for the affected PDS to start downloading the firmware update. As each PD completes its firmware update, its corresponding PDO may notify the corresponding PVO for the PD. In turn, each corresponding PVO may then acknowledge back to the DMO that the firmware update for a PD has completed. In step 420, once the DMO has received an acknowledgement for all affected PDs that their firmware updates have completed successfully, the DMO may return a successful completion message to the original entity that issued the request in step 402.

Figure 9:
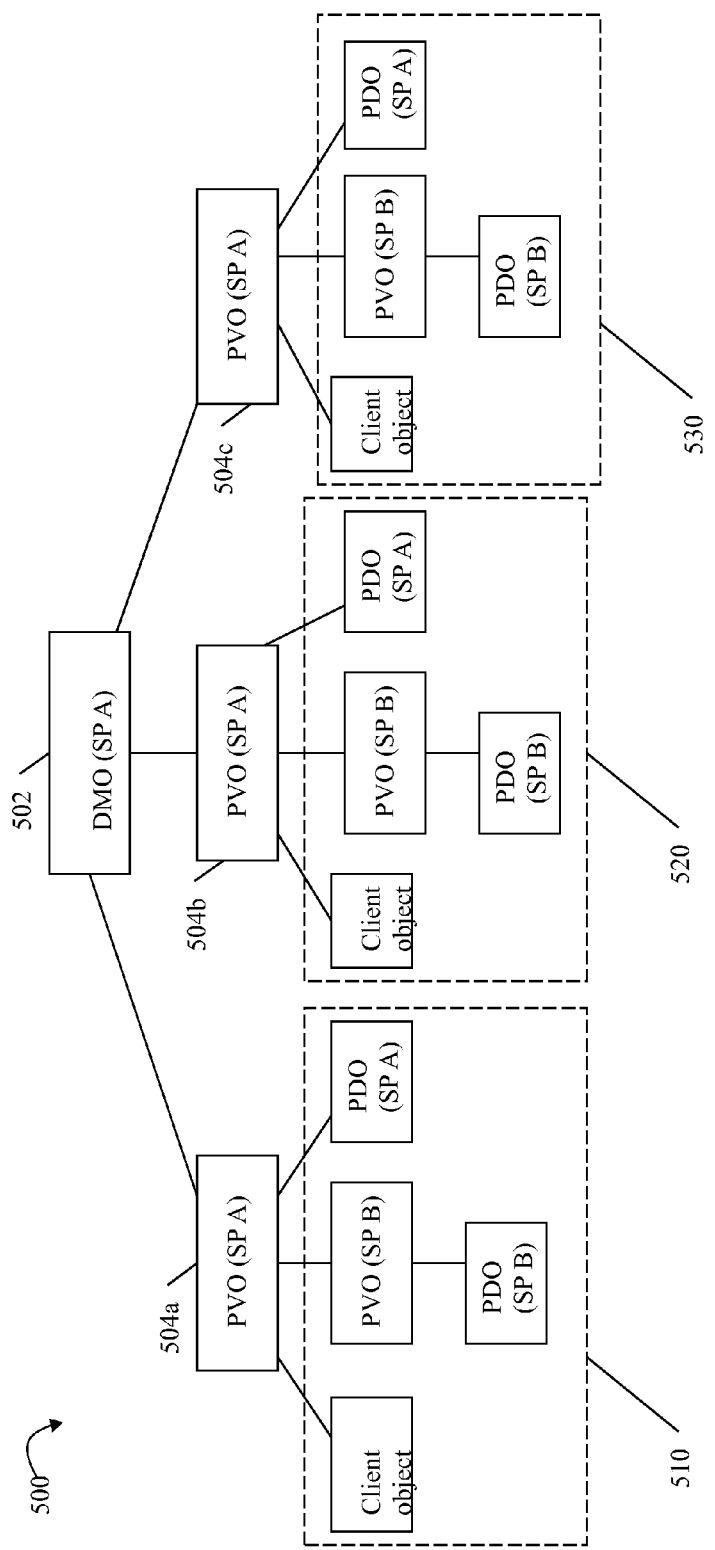

Referring to FIG. 9, shown is an example illustrating use of the techniques herein as may be performed in an embodiment.

The example 500 includes a DMO 502 of SP A that may receive a request to update firmware based on update criteria. The update criteria may identify three PDs of the data storage system to have their firmware updated where each such PD has a corresponding PVO and PDO in SP A and a corresponding PVO and PDO in SP B. The corresponding PVOs for the PDs are denoted as 504a-c which may be notified by the DMO as described in 404 of FIG. 7. From this point onward, each of the PVOs 504a-c and its other associated objects (denoted respectively as 510, 520 and 530) may perform processing independent of the other PVOs and associated objects. For example, each of the PVOs 504a-c and their respective associated objects 510, 520 and 530 may perform processing of steps 406, 408, 412, 410, 414, 416 and 418 of FIG. 7 independently and in parallel with respect to objects for other PDs. In this manner, each of the PVOs 504a-504c may initiate a set of processing steps performed in parallel with respect to others of the PVOs 504a-504c (e.g., the firmware update processing initiated and controlled by each of the PVOs 504a-504c may be performed in parallel thereby allowing for firmware updates to the associated PDs to be performed in parallel.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing a firmware update of physical drives in a data storage system comprising:
    receiving, by a drive management object of a storage processor of the data storage system, a first request to perform a firmware update to physical drives of the data storage system;
    determining, by the drive management object in accordance with criteria included in the first request, one or more physical drives matching the criteria thereby identifying the one or more physical drives as physical drives having firmware to be updated;
    sending, by the drive management object to each of one or more provision drive objects corresponding to the one or more physical drives, a second request to update firmware on said one or more physical drives;
    performing firmware update processing independently for each of the one or more physical drives, each of the one or more provision drive objects associated with one of the physical drives, said firmware update processing for said one physical drive including:
        determining, by said each provision drive object associated with the one physical drive, whether to perform the firmware update to the one physical drive at a current point in time;
        in response to determining to perform the firmware update to the one physical drive at the current point in time, performing preparation processing in connection with preparing for updating the firmware on the one physical drive, the preparation processing further including holding any new incoming input/output (I/O) operations for the one physical drive and completing any in-progress I/O operations for the one physical drive;
        notifying, by said each provision drive object upon completion of said preparation processing, a physical drive object associated with said one physical drive to download the firmware update to the one physical drive; and
        resuming I/O operations to the one physical drive upon successfully completing the firmware update to the one physical drive.

2. The method of claim 1, wherein holding any new incoming I/O operations for the one physical drive includes storing the new incoming I/O operations in a buffer.

3. The method of claim 2, wherein resuming I/O operations to the one physical drive includes performing the I/O operations in the buffer and allowing any subsequently received I/O operations for the one physical drive to be serviced.

4. The method of claim 1, wherein completing any in-progress I/O operations for the one physical drive includes completing any I/O operations commenced prior to performing preparation processing.

5. The method of claim 1, wherein said determining, by said each provision drive object, whether to perform the firmware update to the one physical drive at a current point in time includes querying a client object of said each provision drive object as to whether to perform the firmware update for the one physical drive at the current point in time.

6. The method of claim 5, wherein said each provision drive object receives a response from the client object indicating not to perform the firmware update for the one physical drive at the current point in time and said each provision drive object repeatedly performs the querying at one or more later points in time until a response is received indicating for said each provision drive object to proceed with the firmware update.

7. The method of claim 5, wherein the client object enforces one or more policies setting forth policy criteria as to when a firmware update for a physical drive is allowable.

8. The method of claim 7, wherein the one or more policies includes a first policy indicating that a firmware update for a physical drive is allowable based on policy criteria determined for a particular RAID group configuration.

9. The method of claim 7, wherein the one or more policies includes a first policy indicating that a firmware update for a physical drive that is a mirror of a second physical drive is allowable if the second physical drive is not currently having a firmware update applied thereto and if the second physical drive is currently available to service I/O operations directed to either the first physical drive or the second physical drive.

10. The method of claim 1, wherein said each provision drive objects notifies the drive management object upon successfully completing the firmware update for said one physical drive.

11. The method of claim 1, wherein a plurality of physical drives are determined by the drive management object in accordance with criteria included in the first request as requiting a firmware update initiated by the request, and wherein said firmware update processing is performed in parallel for the plurality of physical drives.

12. The method of claim 1, wherein the storage processor is a first of a plurality of storage processors of the data storage system, and wherein said one or more provision drive objects include a first set of provision drive objects of the first storage processor and a second set of one or more provision drive objects of a second of the plurality of storage processors, each provision drive object of the first set having a counterpart provision drive object of the second set for a same physical drive, wherein each of the one or more provision drive objects in the first set associated with one of the one or more physical drives communicates with a first counterpart provision drive object of the second set in connection with performing processing to prepare for updating firmware of the same physical drive.

13. A computer readable storage medium comprising code stored thereon for performing a firmware update of physical drives in a data storage system, the computer readable medium comprising code for:
receiving, by a drive management object of a storage processor of the data storage system, a first request to perform a firmware update to physical drives of the data storage system;
determining, by the drive management object in accordance with criteria included in the first request, one or more physical drives matching the criteria thereby identifying the one or more physical drives as physical drives having firmware to be updated;
sending, by the drive management object to each of one or more provision drive objects corresponding to the one or more physical drives, a second request to update firmware on said one or more physical drives;
performing firmware update processing independently for each of the one or more physical drives, each of the one or more provision drive objects associated with one of the physical drives, said firmware update processing for said one physical drive including:
determining, by said each provision drive object associated with the one physical drive, whether to perform the firmware update to the one physical drive at a current point in time;
in response to determining to perform the firmware update to the one physical drive at the current point in time, performing preparation processing in connection with preparing for updating the firmware on the one physical drive, the preparation processing further including holding any new incoming input/output (I/O) operations for the one physical drive and completing any in-progress I/O operations for the one physical drive;
notifying, by said each provision drive object upon completion of said preparation processing, a physical drive object associated with said one physical drive to download the firmware update to the one physical drive; and
resuming I/O operations to the one physical drive upon successfully completing the firmware update to the one physical drive.

14. The computer storage readable medium of claim 13, wherein holding any new incoming I/O operations for the one physical drive includes storing the new incoming I/O operations in a buffer.

15. The computer readable medium of claim 14, wherein resuming I/O operations to the one physical drive includes performing the I/O operations in the buffer and allowing any subsequently received I/O operations for the one physical drive to be serviced.

16. The computer readable storage medium of claim 13, wherein completing any in-progress I/O operations for the one physical drive includes completing any I/O operations commenced prior to performing preparation processing.

17. The computer readable storage medium of claim 13, wherein the storage processor is a first of a plurality of storage processors of the data storage system, each of said plurality of storage processors having access to each of the one or more physical drives.

18. A data storage system comprising:
one or more storage processors;
a plurality of physical drives; and
a computer readable medium comprising code stored thereon for performing a firmware update of physical drives in the data storage system, the computer readable medium comprising code stored thereon for:
receiving, by a drive management object of a storage processor of the data storage system, a first request to perform a firmware update to physical drives of the data storage system;
determining, by the drive management object in accordance with criteria included in the first request, one or more physical drives of the data storage system matching the criteria thereby identifying the one or more physical drives as physical drives having firmware to be updated;
sending, by the drive management object to each of one or more provision drive objects corresponding to the one or more physical drives, a second request to update firmware on said one or more physical drives;
performing firmware update processing independently for each of the one or more physical drives, each of the one or more provision drive objects associated with one of the physical drives, said firmware update processing for said one physical drive including:
determining, by said each provision drive object associated with the one physical drive, whether to perform the firmware update to the one physical drive at a current point in time;
in response to determining to perform the firmware update to the one physical drive at the current point in time, performing preparation processing in connection with preparing for updating the firmware on the one physical drive;
notifying, by said each provision drive object upon completion of said preparation processing, a physical drive object associated with said one physical drive to download the firmware update to the one physical drive; and
resuming I/O operations to the one physical drive upon successfully completing the firmware update to the one physical drive.

19. The data storage system of claim 18, wherein the preparation processing further includes holding any new incoming input/output (I/O) operations for the one physical drive and completing any in-progress I/O operations for the one physical drive.

20. The data storage system of claim 19, wherein the data storage system includes a plurality of storage processors and the storage processor is a first of the plurality of storage processors, and wherein said one or more provision drive objects include a first set of provision drive objects of the first storage processor and a second set of one or more provision drive objects of a second of the plurality of storage processors, each provision drive object of the first set having a counterpart provision drive object of the second set for a same physical drive, wherein each of the one or more provision drive objects in the first set associated with one of the one or more physical drives communicates with a first counterpart provision drive object of the second set in connection with performing processing to prepare for updating firmware of the same physical drive.

* * * * *